(No Model.)
J. B. BLOOD.
METHOD OF WINDING COILS FOR DYNAMO ELECTRIC ARMATURES.
No. 503,449. Patented Aug. 15, 1893.
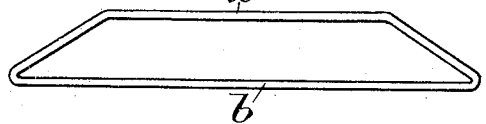 
Fig. 1. Fig. 2.
 
Fig. 3. Fig. 4.
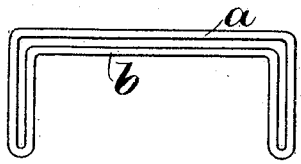 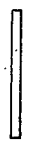
Fig. 5. Fig. 6.
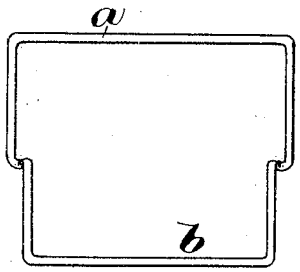 
Fig. 7. Fig. 8.
WITNESSES
Alec F. Macdonald
J. J. Johnston
INVENTOR
John B. Blood
by Bentley and Blodgett
Attys

UNITED STATES PATENT OFFICE.

JOHN B. BLOOD, OF LYNN, ASSIGNOR TO THE GENERAL ELECTRIC COMPANY, OF BOSTON, MASSACHUSETTS.

METHOD OF WINDING COILS FOR DYNAMO-ELECTRIC ARMATURES.

SPECIFICATION forming part of Letters Patent No. 503,449, dated August 15, 1893.

Application filed April 19, 1893. Serial No. 470,934. (No model.)

*To all whom it may concern:*

Be it known that I, JOHN B. BLOOD, a citizen of the United States, residing at Lynn, in the county of Essex and State of Massachusetts, have made certain new and useful Improvements in Methods of Winding Coils for Dynamo-Electric Armatures, of which the following is a specification.

My invention relates to the winding of coils for dynamo electric armatures and has for its object to wind such coils expeditiously, accurately and economically. To this end I have devised an improved method of winding, which consists of winding the coil upon a form and then distorting its shape as more fully pointed out hereinafter.

In the drawings hereunto annexed and hereby made a part of this specification, Figures 1, 3, 5, and 7 are front elevations of the coils in the different stages of my process of winding. Figs. 2, 4, 6 and 8 are end elevations of the coils as shown in Figs. 1, 3, 5 and 7 respectively.

The coil, as seen in Fig. 1, is wound upon a collapsible former of trapezoidal shape, is then removed from the form and the two parallel sides of the trapezoid $a, b$ are brought together by bending the longer side as shown in Fig. 3. The two ends are then brought to a right angle with the parallel sides $a, b$ as shown in Fig. 5. The coil is then opened out into two incomplete rectangles lying in different planes, as shown in Figs. 7 and 8, and may then be applied to an armature in well-known ways.

Having thus described my invention, what I claim as new, and desire to secure by Letters Patent of the United States, is—

The method of forming coils for dynamo electric armatures, which consists in winding the coil upon a trapezoidal form, then removing it therefrom, then bringing its parallel sides together, then bringing its ends to an approximate right angle with such parallel sides, and then opening the coil to form two incomplete rectangles lying in different planes, substantially as described and set forth herein.

In witness whereof I have hereunto set my hand this 17th day of April, 1893.

JOHN B. BLOOD.

Witnesses:
JOHN W. GIBBONEY,
BENJAMIN B. HULL.